W. E. BOCK.
ROLLER BEARING UNIT.
APPLICATION FILED MAY 27, 1916.
1,355,304.
Patented Oct. 12, 1920.
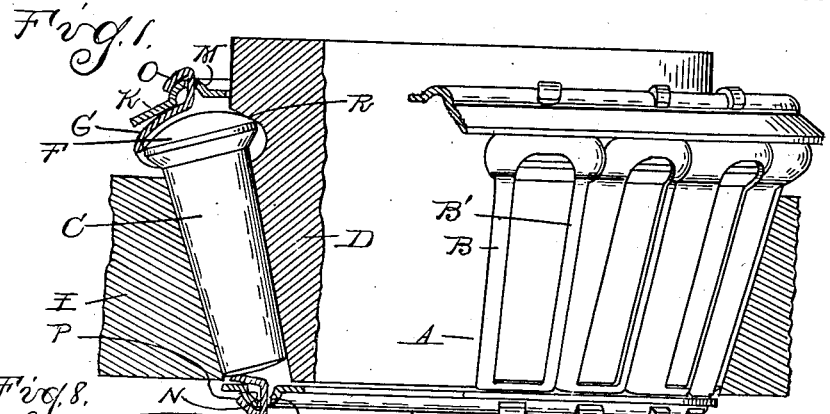
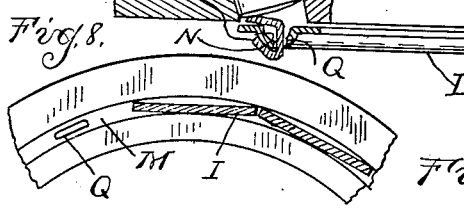
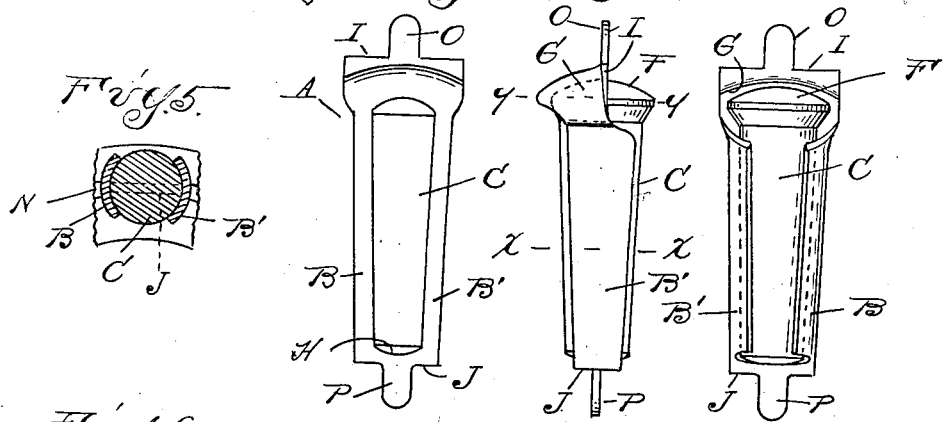
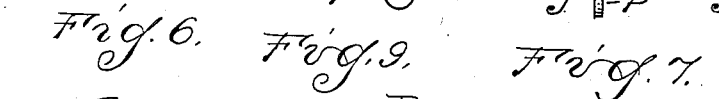
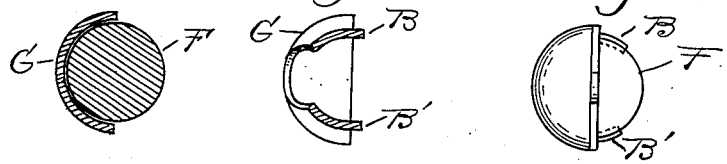
Inventor
William E. Bock
By Whittemore Hulbert Whittemore
Attorney

UNITED STATES PATENT OFFICE.

WILLIAM E. BOCK, OF TOLEDO, OHIO, ASSIGNOR TO THE BOCK BEARING COMPANY, OF TOLEDO, OHIO, A CORPORATION OF OHIO.

ROLLER-BEARING UNIT.

1,355,304.    Specification of Letters Patent.    Patented Oct. 12, 1920.

Application filed May 27, 1916. Serial No. 100,231.

*To all whom it may concern:*

Be it known that I, WILLIAM E. BOCK, a citizen of the United States of America, residing at Toledo, in the county of Lucas and State of Ohio, have invented certain new and useful Improvements in Roller-Bearing Units, of which the following is a specification, reference being had therein to the accompanying drawings.

The invention relates to roller bearings of the type in which the rolls and the spacer cage form an assembled unit engageable with the coöperating race members. It is the object of the invention to obtain a construction which facilitates the assembly of the rolls and in which each roll is held properly spaced and alined with respect to the other rolls. The invention therefore comprises the novel construction of cage having individual roller-holding cells, and further in the method of forming the cells and cage and of assembling the rolls therein as hereinafter set forth.

In the drawings:

Figure 1 is a sectional elevation of a roller bearing embodying my invention;

Figs. 2, 3 and 4 are respectively a front elevation, side elevation and rear elevation of one of the roller-holding cells;

Figs. 5 and 6 are cross sections on lines *x—x* and *y—y* of Fig. 3 respectively;

Fig. 7 is an end elevation of one of the cells;

Fig. 8 is a sectional elevation of a portion of one of the rings of the cage showing the manner of engaging the individual cells therewith; and Fig. 9 is a view similar to Fig. 7 showing a cell before the engagement of the roll therewith.

In the present state of the art of roller bearing construction it is usual to form the roller-holding cages with spacers for separating the rolls, and in some instances for retaining the rollers when disengaged from their race members. It is usual, however, to first form the cage and then to engage the rollers therewith. With the present invention the cage is composed of individual roller-holding cells and the rollers are engaged with their cells prior to the assembly of the latter in the cage. This greatly simplifies and expedites the operation of assembly, while the construction is simple, inexpensive and efficient.

In detail, A are the individual roller-holding cells, preferably formed of pressed sheet metal and having segmental side portions B and B' extending longitudinally of the rolls and cut away sufficiently to provide clearance for the bearing of the rollers C upon the race members D and E. As specifically shown, the rollers C are of conical form and are provided at their large ends with spherical heads F forming thrust bearings, the point of contact being in alinement with the bearing on the side of the roll. The cells A are formed to accommodate this construction of roll and are therefore provided at their large ends with a segmental spherical portion G fitting around the head F and connecting the segmental sides B and B', and at their small ends with a connecting portion H. The portions G and H are also provided with outwardly-extending portions I and J for engagement with rings K and L, which hold the individual cells in assembled relation to each other. Preferably the rings K and L are also formed of pressed sheet metal and are provided with grooved portions M and N for respectively receiving the projecting portions I and J of the cells. The portions I and J are further provided with tongue portions O and P of lesser diameter, which pass through apertures Q in the grooved portions of the rings and are then bent over to form a lock.

In the method of assembling the bearing, the cells are first formed with the sides B and B' thereof sufficiently open to receive the rolls, as shown in Fig. 9. The rolls are then placed in the cells and the sides closed in, as shown in Fig. 7, so as to retain the rolls from disengement. The cells are then assembled with the rings K and L, the tongues O and P being inserted through the apertures Q and then bent over. The grooves M and N, engaging the projecting portions I and J, will hold the cells from twisting or turning, while the bent tongues O and P retain the parts in engagement. The ring K provides clearance for the thrust bearing R on the race member D, and the ring L clears both race members D and E, while the individual cells are also cut away to clear said race members, both for the radial bearings and the end thrust.

What I claim as my invention is:—

1. In a roller bearing, a cage, comprising individual roller-holding cells having their longitudinal axes coincident with the longitudinal axes of their respective rollers, and a connector for said cells.

2. In a roller bearing, a cage, comprising a circular series of individual roller-holding cells having their longitudinal axes coincident with the longitudinal axes of their respective rollers, and an annular connector for said cells.

3. In a roller bearing, a circular series of roller-holding cells having their longitudinal axes coincident with the longitudinal axes of their respective rollers, and annular connectors at opposite ends of said cells.

4. In a roller bearing, an individual roller-holding cell having its longitudinal axis parallel to the longitudinal axis of the roller, and means for mounting said cell in assembled relation to other cells.

5. In a roller bearing, an individual roller-holding cell having its longitudinal axis parallel to the longitudinal axis of the roller and formed of pressed sheet-metal closed about the roller and cut away to expose the bearing portions thereof, and means for mounting said cell in assembled relation to other cells.

6. A roller bearing, comprising an individual roller-holding cell formed of pressed sheet-metal having segmental longitudinally-extending side portions and connecting portions at opposite ends, one of said connecting portions provided with means of attachment to a connector between cells.

7. In a roller bearing, an individual roller-holding cell formed of pressed sheet-metal having segmental side portions, connecting portions at opposite ends, and tongues upon said end portions for attaching the same to the cell connector.

8. In a roller bearing, a series of individual roller-holding cells having projecting end portions, and a connector ring for said cells grooved to receive said projecting end portions.

9. In a roller bearing, a series of individual roller-holding cells having projecting end portions terminating in tongues, and a connecter for said cells grooved to receive said projecting end portions and apertured for the passage of said tongues, the latter being bent over to lock the cells from disengagement.

10. In a roller bearing, an individual roller-holding cell formed of pressed sheet-metal, provided with segmental longitudinally-extending side portions and connecting portions at opposite ends, one of said end portions having a segmental spherical shape.

In testimony whereof I affix my signature in presence of two witnesses.

WILLIAM E. BOCK.

Witnesses:
CARL H. CLEMENT,
ALTA H. CALDWELL.